(12) United States Patent
Kaplan

(10) Patent No.: US 6,850,608 B2
(45) Date of Patent: Feb. 1, 2005

(54) PROCESS FOR ASSIGNING A CALLED NUMBER TO CUSTOMER PREMISES EQUIPMENT

(75) Inventor: Alan Edward Kaplan, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 539 days.

(21) Appl. No.: 09/726,901

(22) Filed: Nov. 30, 2000

(65) Prior Publication Data

US 2002/0064269 A1 May 30, 2002

(51) Int. Cl.[7] .................................................. H04M 5/20
(52) U.S. Cl. .................. 379/177; 379/142.08; 379/188; 379/372
(58) Field of Search ................................ 379/156, 157, 379/201.07, 201.11, 142.06, 372, 183, 177–187, 207.16, 355.01–355.05, 357.01, 188

(56) References Cited

U.S. PATENT DOCUMENTS

| | | | | |
|---|---|---|---|---|
| 4,645,877 A | * | 2/1987 | Curtin | .......................... 379/183 |
| 5,200,994 A | * | 4/1993 | Sasano et al. | .......... 379/142.06 |
| 5,544,235 A | * | 8/1996 | Ardon | .......................... 379/177 |
| 5,699,419 A | * | 12/1997 | Ardon | .......................... 379/156 |
| 6,134,320 A | * | 10/2000 | Swan et al. | .................. 379/372 |
| 6,408,068 B1 | * | 6/2002 | Larson et al. | .......... 379/357.01 |
| 6,456,706 B1 | * | 9/2002 | Blood et al. | ................. 379/188 |

* cited by examiner

Primary Examiner—Fan Tsang
Assistant Examiner—Md Shafiul Alam Elahee
(74) Attorney, Agent, or Firm—Henry T. Brendzel

(57) ABSTRACT

A capability for routing calls that are destined to different called numbers to a single customer line is provided by including apparatus at the customer's line that detects called number ID signals. The detecting of called number ID signals is enabled by installing one or more called numbers ID signals in a memory of a customer premises instrument, or a coupler, that is connected to the customer's line. The installing is carried out in a process that first places the customer premises instrument, or the coupler, in a program mode, and then providing the one or more called number ID signals, for storing in the customer premises instrument, or the coupler. In one embodiment, the service provider provides the one or more called number ID signals.

20 Claims, 2 Drawing Sheets

PROCESS FOR ASSIGNING A CALLED NUMBER TO CUSTOMER PREMISES EQUIPMENT

RELATED APPLICATIONS

This application is related to a number of other applications that have been filed on even date herewith. Their titles are: "A Method for Alerting a Customer Line," "A Multi-line Arrangement," and "Called Party ID Services."

BACKGROUND OF THE INVENTION

This invention relates to the provision of telephone services to plain-old-telephone (POT) customer premises equipment, or POT CPE. In the context of this disclosure POT CPE is CPE that does not employ frequency multiplexing or time multiplexing technology that provides a capability to support more than one connection at any one time.

A telephone service provider's "customer line", which sometimes is referred to simply as the "line," is a telephone wire-pair that extends from the telephone service provider network to a customer's premises. In contrast a telephone "trunk" spans between two switches of the telephone service provider network, or between a provider's switch and a PBX.

Years ago the use of party lines was quite prevalent. In a party line arrangement, two or more parties that have a different called number connect their telephone instrument to a single customer line. Each party can initiate outgoing phone calls, identically to how different extension phones can initiate outgoing calls. Just as with extension phones, however, the party line arrangement provided no privacy. On the incoming calls side, matters are less simple. Given that party A needs to be reachable by dialing called number N1, and party B needs to be reachable by dialing called number N2, it is important to have a method for providing ringing signal to party A or to party B, but not simultaneously to both, based on whether a caller dialed called number N1 or N2. One way to achieve this takes advantage of the fact that a telephone line consists of two wires, called "tip" and "ring," neither of which is grounded. By connecting the ringer of party A between "tip" and ground, and the ringer of party B between "ring" and ground, it is possible to select whether the ringer of party A or party B gets activated by applying the ringing signal between either "tip" and ground or "ring" and ground.

Another approach employs coded ringing, where the audible ringing pattern for one party is different from that for other party or parties. This approach allows creating a party line for more than two called numbers. Often, this approach is used in a household where a teenager gets his, or her, own phone number, but a single customer line (wire pair) is extended into the household.

Because of significant reductions in the cost of switching equipment, not to mention the privacy issue, the use of party lines has all but disappeared and, nowadays, almost all customer lines carry telephone traffic that is destined to one called number, except for households that subscribe to "teen ringing." In "teen ringing" arrangements, the different called numbers that are assigned to a line are alerted with distinctive ringing signal bursts. All extension telephones are subjected to the ringing signal bursts, and users recognize the called number that is being alerted by the different ringing sounds.

Incoming calls, of course, can come from any party whatsoever, and recent advances in telecommunications have recognized that customers may want to have different treatments applied to incoming calls based on the identity of the calling party; e.g., call blocking. To offer customer services based on the calling party's identity the calling party's ID was extended from the switch that originates calls to the switch that terminates calls. To offer customers this information as well, the calling party's ID (typically referred to as "caller ID") concept was invented and patented in U.S. Pat. No. 4,551,581 by Doughty in November 1985.

In accordance with the Doughty patent, a data message (special service messages) may be sent to an on-hook called station during the silent interval between ringing signals that comprises any number of character bytes, each with additional start and stop bits. The first character of the message identifies the type of message such as, for example, calling/called directory number, special service indicator, personal messages, etc. The second character specifies the number of subsequent character bytes in the message. The next characters represent the digits of the calling station directory number, and the last character sent to the called station is a check sum that the station set uses to verify that errors have not been introduced in transmission. This digital information is communicated through frequency shift keying (FSK) modulation of a carrier.

U.S. Pat. No. 5,544,233 describes an arrangement more than one called number is directed to a single line. The switching apparatus that connects to the line encodes the called number (in Frequency Shift Keying) into the analog signal that is sent to the line and, before the switching apparatus applies ringing to the line, a coverter associated with the telephone demodulates and displays the called number and causes an audible sound, such as distinctive ringing, to be sounded. Action other than sounding a ringing can also be taken, in accordance with the programming within the converter. Illustratively, the converter can include a number of ports that are connected to metering devices such as electric meters and water meters, and be further sensitive to a code appended to the called number, which directs the converter to connect to one of such metering devices and send out telemetry data.

SUMMARY OF THE INVENTION

An advance in the art is achieved with an arrangement that enables more than one customer premises instrument to be connected to a customer line and to have the connected instrument either accessed by a service provider, or not accessed by the service provider, based on called number information that is supplied by the service provider. This is achieved by having the customer premises instrument, or a coupler that is interposed between the customer line coming from the service provider and the customer premises instrument, be sensitive to one or more stored called numbers. In one embodiment, the service provider, pursuant to a request to install the number, or numbers, supplies to the customer premises instrument or to the coupler, the stored numbers and places the customer premises instrument, or the coupler, into a program mode. In another embodiment, a user installs the number, or numbers through a dialing device, such as a keypad, that is connected to or coupled to the customer premises instrument, or to the coupler.

DETAILED DESCRIPTION

Figure 1:
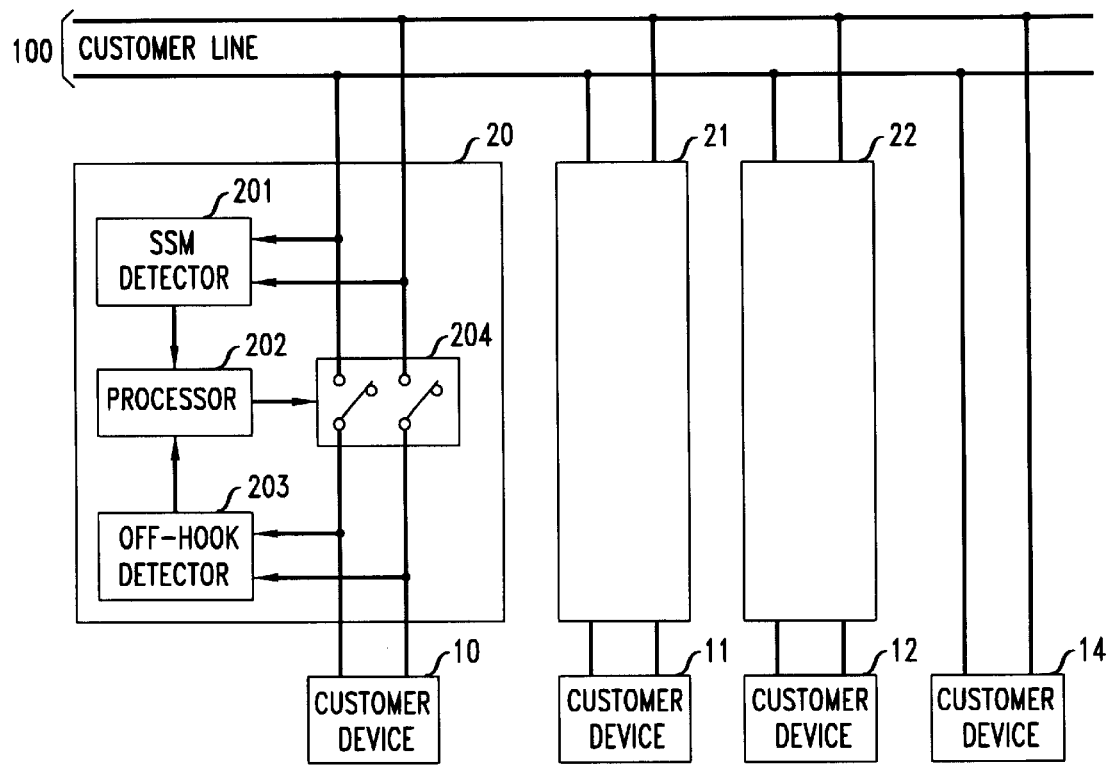
FIG. 1 presents an illustrative block diagram of a customer premises arrangement that employs the principles disclosed herein.

FIG. 1 presents a block diagram of one illustrative embodiment in accord with the principles disclosed herein. It includes conventional telephones 10, 11, and 12 that are coupled to wire pair 100 that comes from a provider's switch, or from a PBX, via couplers 20, 21, respectively. Conventional telephone 13 is connected directly to wire pair 100. Couplers 20 and 21 may be of identical construction, but programmed slightly differently, as disclosed below.

Coupler 20 provides for a connection of telephone instrument 10 to wire pair 100 through a double pole switch 204. In arrangements where the circuitry within coupler 20 is powered by local power, switch 204 is advantageously a "normally closed" switch, which means that in the absence of applied power, the switch is closed. Coupler 20 also includes a special service messages (SSM) detector 201 that is connected upstream from switch 204 (i.e., connected to wire pair 100), and an off hook detector 203 that is connected downstream from switch 204 (i.e., connected to telephone 10). Lastly, coupler 20 includes a processing element 202 that, in response to off-hook detector 203 and to SSM detector 201, controls the state of switch 204 (closed or open). Although elements 201, 202, and 203 are shown as distinct elements, it should be recognized that the functions of all three elements can be carried out in one, common, processing apparatus that, advantageously, may be a stored program controlled processor, with possibly a number of specialized circuits.

Off hook detector element 203, for example, can comprise a large resistor that is connected to between the "plus" terminal of a power source and the first terminal of telephone 10, with the second terminal of telephone 10 being connected to the "minus" terminal of the power source. In such an interconnection, the voltage on the first terminal of telephone 10 is high when the telephone is on-hook, and is low when the telephone is off-hook. This condition is converted to appropriate voltage levels within element 203 and applied to processing element 202 to indicate whether telephone 10 is off hook or not. Thus, switch 20 is closed by processing element 202 when a user places telephone 10 in an off hook condition; for example, when the user is ready to place an outgoing call.

When telephone 10 is in an on-hook condition, processor 202 causes switch 204 to be in an open state, unless SSM detector 201 dictates otherwise. With such an arrangement, incoming signals, and in particular ringing signals, do not reach telephone 10 unless and until processor 202, in response to signals applied to processor 202 by SSM detector 201, dictates the closure of switch 204.

In accordance with the principles disclosed herein, the telecommunication provider's central office sends special service messages to wire pair 100, illustratively, the called number ID (other messages, such as caller ID can also be sent). The special service message can be sent in an identical manner that conventional caller ID is sent; i.e., during the time interval between the ringing-signal bursts. Advantageously, the special service message disclosed herein can be sent at other than the time when the caller ID is sent (which is during the time interval between the first ringing-signal burst and the second ringing-signal burst). The special service message can also be sent with a different format. For easiest implementation, however, the FIG. 1 illustrative embodiment employs the format that is commercially used for caller ID. It may be noted that while the timing of the special service message need not affect the design of the FIG. 1 apparatus, some time saving can be had by sending the special service message prior to the fist ringing-signal burst. In such a circumstance, SSM detector 201 can be a conventional circuit for detecting caller ID of an incoming call. This circuitry thus identifies the called number ID, and that number is applied to processing element 202.

Processor 202 includes an element that stores one or more called number IDs. Though it is expected that most embodiments will store the called number ID in a semiconductor memory associated with processor 202, it may be observed that other memory elements can be used, including a set of switches. The intent is that whichever telephone instrument is connected to coupler, it will act as the telephone to be reached when a call that is destined to the called number, or numbers, stored in processor 202 arrives on wire pair 100. When a memory is used, the number(s) that is (are) stored in the memory can be can be inserted by the user of telephone 10, by the service provider, or by the party that sells couplers 20. A relatively simple approach for storing the appropriate number(s) in the memory of processor 202 is for the user to request the service provider to insert the information into coupler 20 (the coupler chosen for programming). The service provider checks its records to ascertain that the number to be inserted into the memory of processor 202 corresponds to a called number that, according to the service provider's database, is routed to wire pair 100, and then proceeds to send the information to SSM detector 201 in the same FSK modulation format that is used for all special service messages. More specifically, the first character of the special service message is set to indicate that a programming message is being sent and, in response thereto, SSM detector 201 applies the detected characters of the message to processing element 202, with appropriate signaling that directs processing element 202 to store the applied characters.

Of course, the user must arrange so that the programming information that arrives at customer line 100 affects coupler 20 rather than some other coupler, such as coupler 21; i.e., condition the coupler for programming. This can be achieved by including a switch that is coupled to processor 202 (not shown) that the user flips from "operation" mode to "programming" mode. Alternatively, the user makes the programming request via the telephone that is connected to coupler 20 (i.e., by going "off hook" and dialing a preselected code), and stays in the "off hook" condition. When the programming information arrives, the processor whose switch 204 is closed stores the incoming called number information. Alternatively still, if the coupler has a unique ID that is addressable, then the user only needs to specify to the service provider that unique address. Finally, the coupler can be conditioned into a programming mode by entering a predetermined code via a keypad.

In accordance with the principles disclosed herein, the service provider adopts the paradigm that all calls that are to be terminated at a customer premises equipment (via a customer line from the provider's central office, or some other apparatus—such as a multiplexer/demultiplexer of a digital loop carrier system) cause an alert signal to be sent to the customer's line that includes a special service message which identifies the called party number in addition to the conventional ringing-signal bursts. By adopting this paradigm, the service provider can translate more than one called number to a given customer line. Thus, the customer with the FIG. 1 arrangement can have two or more called numbers that translate to (i.e., routed to) wire pair 100, and the telephone instruments can be made to be responsive to the incoming in any manner desired. To illustrate, the service provider may be adapted to route calls to wire pair 100 that are destined to called numbers A, B or C. That means the incoming calls on wire pair 100 contain called number information, and that information specifies either called number A, B, or C. To further illustrate, the FIG. 1 arrangement can be set up so that coupler 20 has called numbers A and B in its memory, coupler 21 has called numbers B and C in its memory, and coupler 22 has called number C in its memory. With such an arrangement, calls where the alert signal contains a special service message that specifies called number A causes telephone instruments 10 to ring but not telephone instruments 11 and 12, calls where the alert signal contains a special service message that specifies called number B causes telephone instruments 10 and 11 to ring but not telephone instrument 12, and calls where the alert signal contains a special service message that specifies called number C causes telephone instruments 11 and 12 to ring but not telephone instrument 10. Since telephone instrument 13 has no interposed coupler, it rings regardless of which called number is specified in the alert signal.

The reason why only telephone instrument 10 rings when the incoming call specified called number A is because SSM detector 201 detects the presence of the services message that specifies called number A, and processor 202 recognizes that called number A is one of the numbers to which it should respond. Accordingly, processor 202 causes the closure of switch 204, which enables the ringing signal bursts that follow to reach telephone instrument 10. When, in response to the alert signal any of the phones goes off hook, the alert signal stops in a conventional manner.

The above describes the incoming calls situations but, of course, all of the couplers should be adapted to allow the connected telephone instrument to dial out as well as to receive calls. The problem is that when switch 204 is in an open state, wire pair 100 cannot tell when telephone 10 goes off-hook. To overcome this difficulty, coupler 20 includes an off-hook detector 203 that is sensitive to the impedance presented by telephone instrument 10. When that impedance switches from a high value to a low value, the detector concludes that instrument 10 went off-hook. Detector 203 informs processor 202 of this fact, and processor 202, in turn, closes switch 204. Closing switch 204 allows appropriate current to flow through wire pair 100, allowing the detection of the off-hook condition by the telecommunication provider.

The same situation occurs with a conversation is in progress with one of the telephone instruments that is coupled to wire pair 100, and another of the telephone instruments goes off hook. Detector 203 of this other telephone instrument detects the off-hook condition, informs processor 202, and processor 202 closes switch 204. Thus, this other telephone instrument telephone "cuts through" and is able to participate in the conversation.

Figure 2:
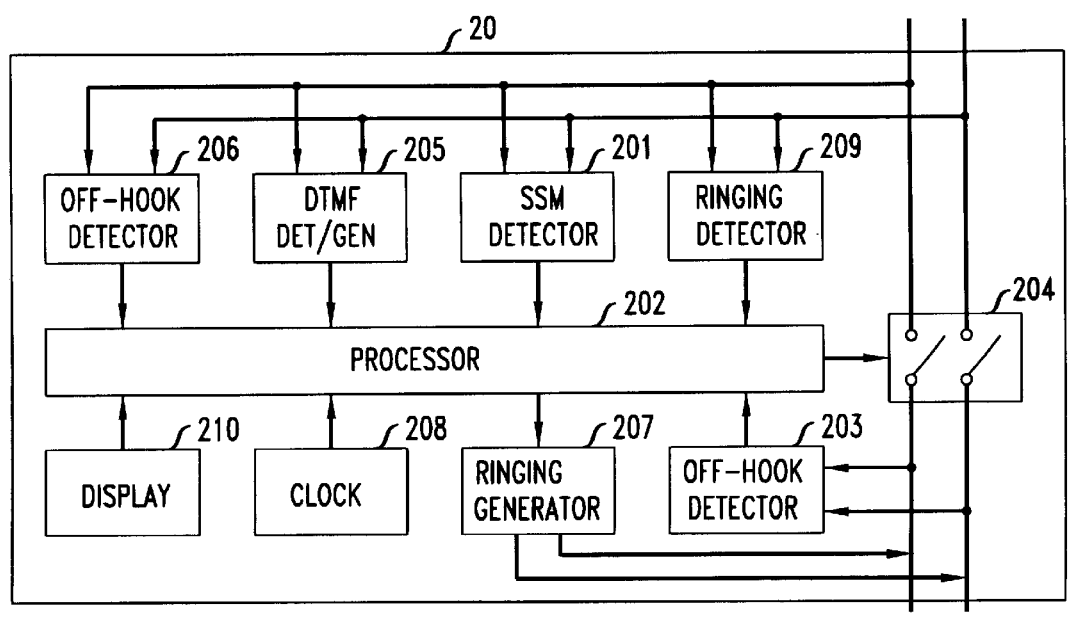
FIG. 2 shows an augmented block diagram of element 20 in FIG. 1.

There are numerous operational enhancements that can be realized by adding a number of modules to coupler 20, and FIG. 2 depicts a number of them. Although the modules shown in FIG. 2 are shown being distinct from processor element 202, it should be understood that various ones of these modules could be implemented within processor element 202.

For example, the above description indicates that the service provider effectively programs the module, such as module 20, (e.g. stores the called number or numbers to which that the coupler is to be responsive) pursuant to a request from the user (and a conditioning of the coupler to be programmed, or a specification of an address of an uniquely addressable coupler). The FIG. 2 arrangement allows the user to insert the called number directly into the memory of processor 202. In accordance with one approach, the keypad of telephone 10 can be used, after coupler 20 is placed into a "program" mode. Placing coupler 20 into a "program" mode can be achieved with the aforementioned switch that is connected to processing element 202, or through a special sequence of digits that are entered by the user via telephone 10, prior to entering the called number that is to be stored in the memory of processor 202. Since the telephone generates DTMF signals that need to be converted to digits, it is necessary to interpose a DTMF detector between the output terminals of telephone 10 (upstream or downstream from switch 204) and processor 202. This is shown, for example, by the connection of DTMF detector 205. Element 205 might, advantageously, be adapted to also detect dial pulse-type signaling from telephone 10. Actually, element 205 can be a keypad that is used to place the coupler into a program mode (through the user entering a preselected sequence of digits), and to actually enter the called number of numbers to which coupler 20 will be responsive. Of course, when element 205 is a keypad, then the shown connections from customer line 100 to element 205 are superfluous.

In some cases it may be useful for coupler 20 to be able to detect whether the line is busy. It is quite conventional to provide this capability, so that a person does not pick up an extension phone (e.g. to attempt to dial out). Herein, it is actually possible to not only detect whether line 100 is in used, but to prevent "cut-through." This is achieved with off hook detector 206 that is connected upstream from switch 204 and provides its "off hook" information to processing element 202 that, in turn, controls the closure of switch 204. Specifically, coupler 20 can be programmed so that when switch 204 is not closed upon the detection by off-hook detector 203 of an "off-hook" condition, unless off-hook detector 206 has not previously detected an "off-hook" condition.

The description relative to the FIG. 1 coupler 20 addressed an arrangement where coupler 20 is responsive to the special service message that is embedded in the alert signal. That message informs the coupler of the identity of the called number. Since there are existing arrangements where a central office does not send a special service message, but distinguishes between called numbers through distinctive ringing patterns, the enhanced FIG. 2 coupler includes module 209, which accommodates this source of called number information. Module 209, illustratively, captures the ringing signal bursts and converts them to levels. Those levels are applied to processor 202, which determines the coded pattern of ringing signal bursts within the first ringing signal cycle, and based on that coded pattern ascertains the identity of the called number. Module 209 needs to only detect the presence of ringing signal power, which can be accomplished with a conventional bridge circuit feeding a low pass filter, where the bridge is made up of four elements, each of which being a series connection of a diode and a Zener diode. Alternatively, module 209 can simply detect ringing voltage cycles in excess of a preselected level (e.g., also with a Zener diode) and apply these voltage cycles to processor element 209 for counting. Once the identity of the called number is ascertained, the operation of the FIG. 2 coupler continues as described above.

The FIG. 2 coupler also includes a display module 210, as well as a clock module 208. The combination of clock module 208, processor element 202 and display 210 provide users with information about the time of day as well as date information. In addition, the clock provides information that allows the operation of coupler 20 to be time sensitive. For example, ringing can be completely inhibited at certain times, or ringing can be inhibited at those certain times from all but a selected number of calling parties. That, of course, implies that the user subscribes to caller ID service and that, therefore, the ringing signal includes caller ID information. That information, as well as called number information, is advantageously displayed on display module 210. Of course, the called number information (whether explicit or derived from a ringing pattern) can also be used for screening.

Lastly, the FIG. 2 coupler includes a ringing generator 207 that supplies ringing signal to telephone 10. This module is included to permit processor 202 to not only display the called number via display 210 but to also provide distinctive ringing based on the called number, or based on any other criterion that the user may select. Such other criteria might be the fact that the incoming call is a collect call, a credit card call, an international call, a cellular call, etc. This information is provided in the special service messages that the provider may include in the alert signal and that SSM detector 201 captures and communicates it to processing element 202. In cooperation with provides that also provide a time/date signals, detector 201 captures clock synchronization signals from wire pair 100, which allows processing element 202 to synchronize clock 208 to that of the service provider.

In fact, given a coupler such as the one shown in FIG. 2, the alert signal does not have to include any ringing signal bursts. Any of the special service messages, including, for example, the called number information per se can serve as the alert signal, with processor 202 causing generator 207 to generate appropriate actual ringing signals (bursts, or otherwise) that are applied to the associated customer device, e.g., telephone 10.

It should be recognized that embodiments of coupler 20 (21 or 22) are likely to require external power because only a limited amount of current can be drawn from wire pair 100 before the provider's equipment that is connected to wire pair 100 will interpret the current drain as an off-hook condition. The external power is most likely provided from a small power supply, not unlike the power supplies that are conventionally used in telephony. Externally supplied power, however, can be lost. To most people it is important to not lose the ability to make, or receive, calls even when external power is off. To provider for this capability, the interposed switch 204 of a coupler that intends to connect to a conventional telephone should be a "normally closed" switch. If, on the other hand, the customer's device itself requires external power, such as when the device is a fax machine, a modem, or the like, it is not important for switch 204 to be a "normally closed" switch; that is, switch 204 can be a "normally open" switch. The latter has a slight advantage since power does not need to be dissipated when the switch is open that, in the FIG. 1 arrangement is the prevalent condition.

Figure 3:
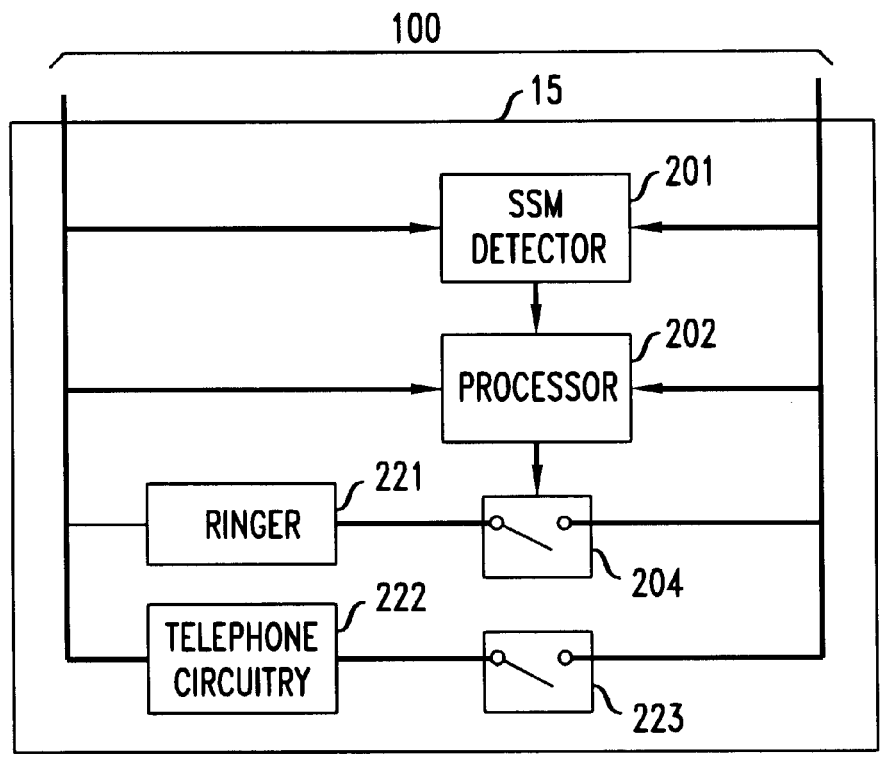
FIG. 3 presents another illustrative block diagram of a customer premises arrangement that employs the principles disclosed herein.

Other enhancements are also possible that comport with the principles disclosed herein. To give one example, most of today's telephones comprise electronic circuits with processors. The circuitry of coupler 20 can be easily incorporated into the circuitry of the telephone and, indeed, simplified somewhat. This is illustrated in the FIG. 3 instrument 15, where ringer 221 is connected in series with switch 204, both being in parallel with the series connection of telephone circuitry 222 and hook switch 223, and where, because the keypad of the telephone is connected directly to processor 202, element 205 of FIG. 2 can be eliminated.

To give another example, the called number ID described above is sent to all customers, but that does not need to be so. The service provider can look up a database of customers who have more than one called number that is routed to a single customer line, and provide the called number ID to only those customers.

To give yet another example, processing element 202 can provide electronic control of the operability of telephone instruments based on called number, time of day, day of week, caller ID, type of incoming call, or combinations thereof. Disabling the operability of a telephone instrument can be for both incoming and outgoing calls, although it is likely that users will program their coupler so as to disable only selected calls. The disabling can be in the form of "all calls other than x are disabled," where x is a list of numbers, or a criterion on the allowed numbers (e.g., three digit numbers, such as 911), or it can be of the form "all call allowed, other than x," where x is, again, a list of numbers or a criterion, such as "international calls."

Of course, disabling the telephone instrument of a teenager invites attempts to override the parental control. To prevent such override, processor 202 can include a password hurdle that needs to be overcome before coupler 20 can be placed in its "program" mode.

What is claimed is:

1. A process for assigning a called number to a CPE instrument connected to a customer POTS line through a coupler, comprising the steps of:

confirming said called number for said customer line by reference to a database, sending to said customer line a signal that contains a start-programming code, and sending to said customer line a signal that contains said called number.

2. The method of claim 1 where said start-programming code includes an address of said CPE instrument.

3. The method of claim 1 further comprising the step of conditioning said coupler to accept and respond to said start-programming code and to said signal that contains said called number.

4. The method of claim 3 where said conditioning to respond includes storing said called number in memory.

5. The process of claim 1 further comprising the step of receiving a request from said customer line, preceding said step of confirming.

6. The process of claim 1 further comprising the step of receiving a request from said customer line, preceding said step of confirming, that specifies said called number.

7. A method of assigning a plurality of called telephone numbers to an arrangement that includes at least two distinct communication instrument arrangements, where each telephone communication arrangement comprises a communication instrument that is coupled, via its associated coupler, to a POTS telephone line that is common to all of said communication instrument arrangements, which coupler includes a processor responsive to input signals from said POTS telephone line that controls operability of a ringer on its associated communication instrument, comprising the steps of:

each of said couplers in said at least two distinct communication arrangements, receiving signals;

decoding said signals to collect decoded digits; and storing said collected digits in a memory accessed by said processor as said at least one called number so as to enable said each of said couplers to allow an alert signal arriving at said POTS telephone line to pass through to its associated communication instrument, independently of all other couplers, when said alert signal specifies any one of said at least one called number that is stored in said each of said couplers.

8. The method of claim 7 where said DTMF signals are applied to said coupler by means of a key pad.

9. The method of claim 8 wherein said keypad is on CPE equipment connected to said coupler.

10. The method of claim 8 further comprising the step of placing said coupler into a program mode by action of a physical switch or by entering a predetermined sequence of digits on said keypad.

11. A customer premises arrangement including a central office telephone line and at least two distinct communication instruments, the improvement comprising:

a distinct coupler interposed between each of said communication instruments and said central office telephone line, which coupler includes a processor responsive to input signals from said POTS telephone line that connects the central office line to its associated instrument when an alert signal incoming from said central office line contains a called number identification signal that corresponds to one or more numbers stored in said coupler.

12. A method of assigning at least one called number to an analog CPE instrument coupled to a central office comprising the steps of:

placing said CPE instrument in program mode;

decoding digits contained in a special service message arriving from said central office; and storing said digits for electronic comparison of said digits to digits contained in a special service message that arrives thereafter.

13. The method of claim 12 wherein said decoding and said storing are carried out within said CPE instrument.

14. The method of claim 12 wherein said decoding and said storing are carried out within a coupler that is interposed between said CPE instrument and said central office.

15. The method of claim 12 wherein said placing said instrument in a program mode comprises the steps of:

placing said CPE instrument in an off-hook condition, requesting said central office to program said CPE instrument, and staying in said off-hook condition.

16. The method of claim 12 wherein said placing said instrument in a program mode comprises the steps of:

dialing a preselected code via a keypad, or pulse dialer, of said CPE instrument, and requesting said central office to program said CPE instrument.

17. The method of claim 12 wherein said placing said instrument in a program mode comprises the steps of:

placing one or more switch in a programming state, and requesting said central office to program said CPE instrument.

18. The method of claim 12 wherein said placing said instrument in a program mode comprises the steps of:

specifying an ID to said central office, and requesting said central office to program said CPE instrument.

19. The method of claim 12 where said step of placing is performed by detecting arrival of a predetermined special service message.

20. The method of claim 19 where said special service message is embedded in an alert signal that also contains ringing-signal bursts.

* * * * *